I. A. STRINGFELLOW.
Machines for Balling Twine.
No. 158,331. Patented Dec. 29, 1874.
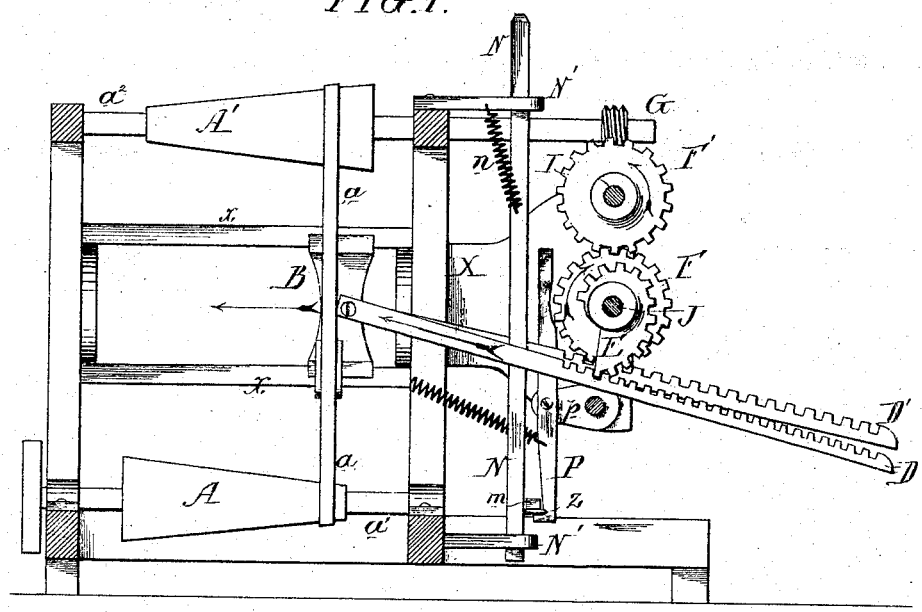
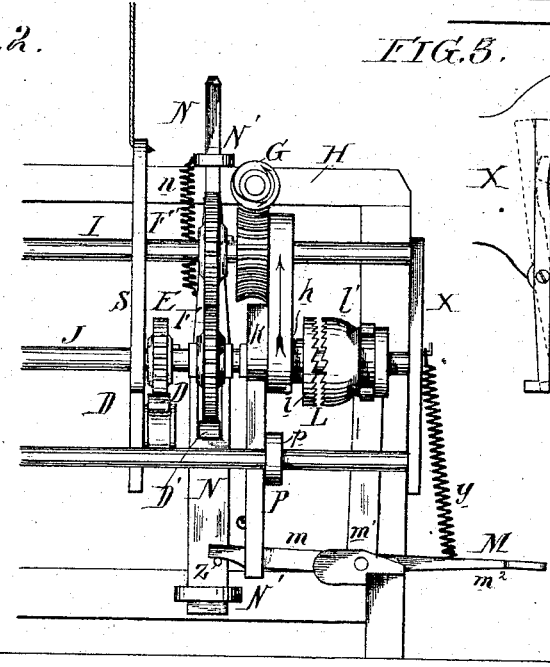
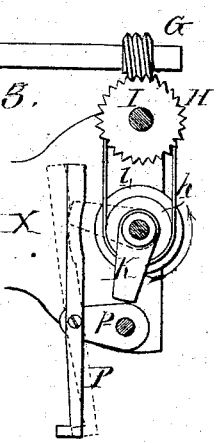
Witnesses: Hubert Howson
Thomas McIlvain
Isaac A. Stringfellow
by his Atty.
Howson and Son

UNITED STATES PATENT OFFICE.

ISAAC A. STRINGFELLOW, OF PHILADELPHIA, PENNSYLVANIA.

IMPROVEMENT IN MACHINES FOR BALLING TWINE.

Specification forming part of Letters Patent No. 158,331, dated December 29, 1874; application filed October 26, 1874.

*To all whom it may concern:*

Be it known that I, ISAAC A. STRINGFELLOW, of Philadelphia, Pennsylvania, have invented certain Improvements in Machines for Balling Twine, &c., of which the following is a specification:

The object of my invention is to provide a differential motion for twine-balling machines by the mechanism illustrated in the accompanying drawing, in which—

Figure 1 is a transverse section of the apparatus; Fig. 2, an end view, and Fig. 3 a view showing the reversing mechanism.

Balls of twine have to be wound very rapidly in the first instance, the speed of the ball being decreased as it increases in size, and this has been usually accomplished through the medium of a band passing round two cone-pulleys, the said band having been moved along the pulleys by mechanism operated by hand, so as to produce the desired variable speed. I substitute for the hand appliances, which are never certain in their movements, automatic mechanism, which I will now proceed to describe.

In suitable bearings in the frame turn the two cone-pulleys A and A', round which passes the band $a$, the latter being under the control of the belt-shifter B, which slides on guides $x$ $x$, the pulley A being on the driving-shaft $a^1$, and the pulley A' on the shaft $a^2$, one end of which has a pulley for driving the usual winding mechanism, and the other end gearing into the belt-shifting mechanism, as explained hereafter. To the belt-shifter B are pivoted the two racks D and D', the former gearing into the toothed cam E, secured to the shaft J, and the latter into the cog-wheel F, which is loose on the said shaft. The worm G on the shaft $a^2$ communicates motion through the worm-wheel H to the shaft I, on which is keyed the cog-wheel F', gearing into the said cog-wheel F. The shafts I and J turn in brackets X, secured to the main frame of the machine. A pulley, $h$, on the shaft J, driven from the shaft I, has an arm, K, and is connected to or forms a part of the portion $l$ of the clutch L, all turning loosely on the said shaft J. The three-armed lever M, which is maintained in position by the clutch on the lower end of the lever P, hung to the bracket $p$, is the medium through which the clutch L is moved in and out of gear. The rack D' is maintained in gear with the cog-wheel F by means of the slotted bar N sliding in the guides N', and acted on by a spring, $n$, and the rack D is always maintained in contact with the toothed cam E by means of the support S, connected to some suitable weight or spring, so as to allow the rack to yield to said cam.

At the commencement of the operation of winding a ball of twine, the several parts of the machine are in the position shown in Fig. 1. Motion is imparted from the driving-shaft, through the cone-pulleys A A', worm G, and gear-wheel H, to the shaft I, which in turn communicates motion through the cog-wheel F' to the cog-wheel F, which drives the rack D' and belt-shifter B, to which the rack is attached, in the direction of the arrow. The belt-shifter consequently moves the belt rapidly toward the large end of the cone-pulley A and the small end of the cone-pulley A', the shaft of which will impart increased speed to the winding mechanism. When the belt, traversing in the direction of the arrow, has reached the ends of the cone-pulleys, the arm K will have attained the position shown by dotted lines in Fig. 3, and will have pushed the upper arm of the catch-lever P outward, thus releasing the arm $m$ of the lever M, which, actuated by the spring $y$, will throw the clutch L into gear, the rack D' being simultaneously thrown out of gear with the cog-wheel F by the fall of the slotted bar N, which is depressed by the arm $m$ of the lever M resting on the pin $z$. When the clutch is thus thrown into gear, the shaft J and its toothed cam E, gearing into the rack D, will move the latter, and with it the belt-shifter, in a direction contrary to that pointed out by the arrow, and at a differential speed, the movement being at first comparatively slow, and gradually increasing in speed, owing to the peculiar shape of the toothed cam, and this differential movement, imparted to the belt-shifter, will regulate the shaft $a^2$ in accordance with the requirements of the winding mechanism. When the cam-wheel E and the belt-shifter B have reached the position shown in Fig. 1, an attendant depresses the treadle $m^2$, which forms one arm of the lever M, thus restoring the different parts referred to above to the positions shown in Figs. 1 and 2.

I claim as my invention—

1. The combination, substantially as described, of the slide B, adapted to the belt of the two cone-pulleys, the cog-wheel F, the cam-wheel E, and the feed-operating mechanism, with the racks D and D', the latter of which admits of being thrown in and out of gear with the said wheel F, as set forth.

2. The combination of the three-armed lever M, clutch-lever P, clutch L, and arm K, all as set forth.

In testimony whereof I have signed my name to this specification in the presence of two subscribing witnesses.

ISAAC A. STRINGFELLOW.

Witnesses:
HUBERT HOWSON,
HARRY SMITH.